United States Patent
Xu et al.

(10) Patent No.: US 7,148,999 B2
(45) Date of Patent: Dec. 12, 2006

(54) VARIABLE GLOSSMARK

(75) Inventors: Beilei Xu, Penfield, NY (US); Shen-ge Wang, Fairport, NY (US); Chu-heng Liu, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 1097 days.

(21) Appl. No.: 10/186,065

(22) Filed: Jun. 27, 2002

(65) Prior Publication Data

US 2004/0000786 A1 Jan. 1, 2004

(51) Int. Cl.
*H04N 1/405* (2006.01)
*G06K 15/00* (2006.01)
*B41M 3/10* (2006.01)

(52) U.S. Cl. ............ 358/3.06; 358/3.17; 358/3.19; 358/3.2; 358/3.28

(58) Field of Classification Search .......... 358/1.9, 358/3.06, 3.13–3.2, 3.09, 2.1, 3.26–3.28, 358/533–536; 382/173, 237, 270; 235/494; 283/113
See application file for complete search history.

(56) References Cited

U.S. PATENT DOCUMENTS

| 4,210,346 A | 7/1980 | Mowry, Jr. et al. ........... 283/94 |
|---|---|---|
| 4,310,180 A | 1/1982 | Mowry, Jr. et al. |
| 5,487,567 A | 1/1996 | Volpe ........................ 283/72 |
| 5,583,660 A | 12/1996 | Rylander ................. 358/3.17 |
| 5,695,220 A | 12/1997 | Phillips ..................... 283/91 |
| 5,734,752 A | 3/1998 | Knox ........................ 382/212 |
| 5,788,285 A | 8/1998 | Wicker ...................... 283/93 |
| 5,790,703 A | 8/1998 | Wang ........................ 382/212 |
| 5,853,197 A | 12/1998 | Mowry, Jr. et al. .......... 283/91 |
| 6,108,512 A | 8/2000 | Hanna ....................... 399/366 |
| 6,606,168 B1* | 8/2003 | Rylander ................. 358/3.09 |
| 6,714,320 B1* | 3/2004 | Nakahara et al. .......... 358/3.13 |
| 6,906,825 B1* | 6/2005 | Nakahara et al. ............ 358/1.9 |

FOREIGN PATENT DOCUMENTS

| EP | 0 610 035 A2 | 8/1994 |
|---|---|---|
| EP | 0 859 506 A1 | 8/1998 |
| GB | 2 217 258 A | 10/1989 |

\* cited by examiner

*Primary Examiner*—Scott A. Rogers
(74) *Attorney, Agent, or Firm*—Christopher D. Wait

(57) ABSTRACT

The present invention relates to the segmentation of an image into a main area and a image segment for variable glossmark data. By selectively applying halftones with anisotropic structure characteristics which are significantly different in orientation while remaining identical in density to the image segment, a variable glossmark may be superimposed within an image with reduced processing and storage requirements.

36 Claims, 4 Drawing Sheets

VARIABLE GLOSSMARK

CROSS REFERENCE

Cross reference is made to the following applications, the disclosures of each of which are totally incorporated by reference herein: application Ser. No. 10/159,432, entitled "APPLICATION OF GLOSSMARKS FOR GRAPHICS ENHANCEMENT" to inventors Shen-ge Wang, Beilei Xu, and Chu-heng Liu; application Ser. No. 10/159,423, entitled "HALFTONE IMAGE GLOSS CONTROL FOR GLOSS-MARKS", to inventors Shen-ge Wang, Beilei Xu, and Chu-heng Liu; and application Ser. No. 10/184,219, entitled "PROTECTING PRINTED ITEMS INTENDED FOR PUBLIC EXCHANGE WITH GLOSSMARKS" to inventors Shen-ge Wang, Beilei Xu, and Chu-heng Liu. The appropriate components and processes of the above co-pending applications may be selected for the invention of the present application in embodiments thereof.

BACKGROUND

The present invention in various embodiments relates generally the gloss inherent in the hardcopy of image data be it pictorial or text. More particularly, this invention relates to halftoned image data and the control of differential gloss when that halftone image data is printed into hardcopy.

It is desirable to have a way to protect against the copying of a document. Most desirably in a manner that part of the content can be readily observed by a human reader but not by a copier scanner. It is desirable that such a solution also have a minimum impact in its digital processing overhead requirements as well as minimizing any storage requirements. One approach is where an image is printed using clear toner or ink, creating a difference in reflected light and diffused light that can be discerned by a human reader by holding the paper at an angle, but can not be detected by a copier scanner which is restricted to reading at right angles to the page.

There has been a need for a printer that can print a page that can be read but not copied. One method, described in U.S. Pat. Nos. 4,210,346 and 5,695,220, is to use a particular white toner and a particular white paper that are designed to have different diffused light characteristics at different angles. Of course, this system requires special, matched paper and toner.

In U.S. Pat. No. 6,108,512 to Hanna, there is illustrated, for example, a system for producing non-copyable prints. In a xerographic printer, text is printed using clear toner. Thus, the only optical difference between toner and non-toner portions of the page is in the reflectivity. The plastic toner will reflect more light than the paper. A human reader can now read the image by holding the page at such an angle that the eye will intercept the reflected light from the toner, producing a contrast between the lighter appearing toner and the darker appearing paper. However, a copier scanner is always set up to avoid reflected light, by supplying light at an oblique angle and reading at a right angle. In this case, the diffused light is approximately equal for both toned and untoned surfaces, the scanner will detect no difference and the copier will not be able to copy the original.

Another approach taken to provide a document for which copy control is provided includes digital watermarking. As an example is in U.S. Pat. No. 5,734,752 to Knox, there is illustrated a method for generating watermarks in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

For each of the above patents and citations the disclosures therein are totally incorporated herein by reference in their entirety.

As disclosed in U.S. application Ser. No. 10/159,423 entitled "HALFTONE IMAGE GLOSS CONTROL FOR GLOSSMARKS", to inventors Shen-ge Wang, Beilei Xu, and Chu-heng Liu (cross referenced and incorporated above), there is provided an arrangement and methodology which will control gloss and allow manipulation for glossmarks without requiring special toners/inks or paper/substrates, nor require the superimposition of additional prints to allow viewing. However, with such an arrangement and methodology, there is inherent a requirement for additional electronic processing beyond that otherwise normally needed. There may also be increased storage requirements entailed as well. It would therefore be desirable to minimize the impact of such required additional electronic processing with a variant providing a further improved methodology for the manipulation of inherent gloss.

The present invention relates to a method for variable glossmark control comprising segmenting an image of interest into a main area and a segment area. Selection is made of a first halftone having a first anisotropic structure orientation and a second halftone having a second anisotropic structure orientation different from that of the first halftone. The first halftone is applied to the main area and at least some portion of the segment area. The second halftone is applied to the remaining portion of the segment area to produce a variable glossmark.

The present invention also relates to a method for variable glossmark control comprising segmenting an image of interest into a main area and a segment area. Selection is made of a first halftone having a first anisotropic structure orientation, a second halftone having a second anisotropic structure orientation different from that of the first halftone, and a third halftone different from the first halftone and the second halftone. The first halftone is applied to at least some portion of the segment area. The second halftone is applied to the remaining portion of the segment area to produce a variable glossmark. The third halftone is applied to the main area.

DESCRIPTION

By proper utilization of the perceived differential gloss inherent between various anisotropic halftone dot structures, the desired manipulation of perceived gloss and the generation of glossmarks via that differential gloss may be achieved without the need for special paper or special toners or inks.

Figure 1:
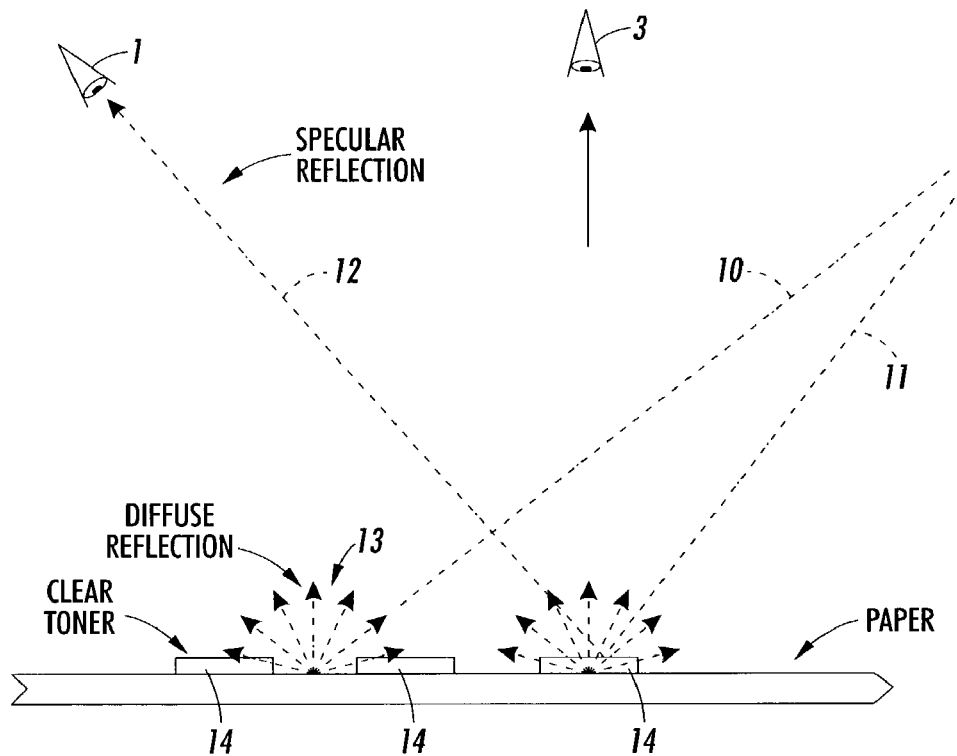
FIG. 1 shows how the human eye can detect a large difference between the glossy portions of the page but a scanner detector cannot.

FIG. 1 shows how the human eye 1 can read gloss upon the page and a scanner cannot. Three glossy areas 14 are shown. One ray of light 10 from the light source 2 hits the paper at a point where there is no gloss toner 14, and the reflected light 13 is diffused so that there is only a small amount of light in all directions, including the direction toward the human eye 1. Another ray of light 11 of equal intensity touches the paper at a point where there is gloss toner 14. Here, there is a large amount of reflected light 12 in the indicated direction. If the human eye 1 is positioned as shown, a large difference between glossy and non-glossy toner areas is readily observable by the human eye 1. However, the scanner 3 reads incident light at right angles to the paper. In this case, there is only a small amount of diffused light coming from both the glossy and non-glossy dots, and the scanner can not detect a difference. This is one manner for creating a gloss image which cannot be scanned by conventional copiers and scanners.

Figure 2:
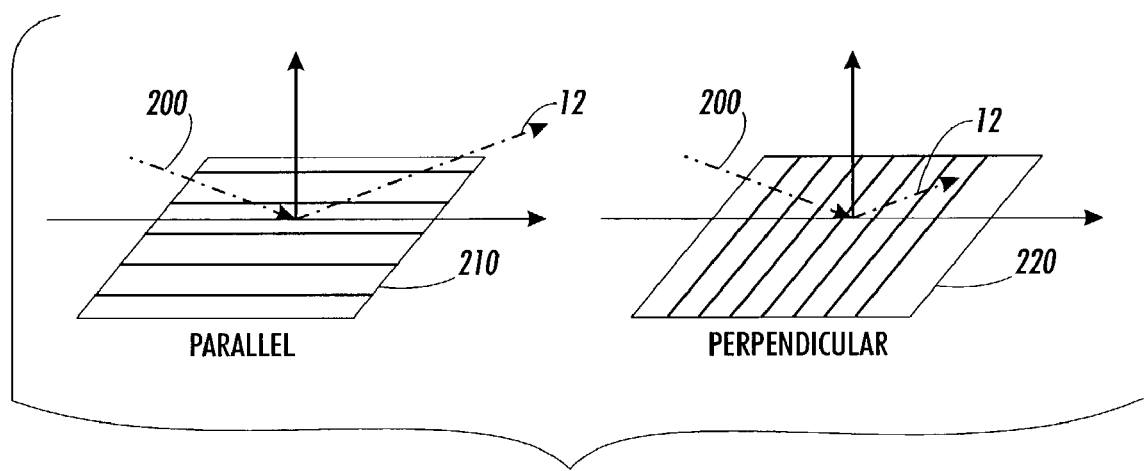
FIG. 2 depicts a differential gloss found in simple line-screen halftones.

Heretofore, there has been little appreciation for the fact that the inherent reflective and diffusive characteristics of halftones may be manipulated to be directive of incident light as about an azimuth by use of a halftone structure which is anisotropic in nature. A mirror is equally reflective regardless of the azimuth of the light source relative to the plane of the mirror. Similarly, an ordinary blank paper is equally reflective and diffusive regardless of the azimuth of the light source. However, printed matter can and will often display differing reflective and diffusive characteristics depending upon the azimuth of origin for a light source relative to the structural orientation of the halftone. Such reflective characteristics when maximized are exhibited in a halftone with a structure which is anisotropic in nature. In other words, the indicatrix used to express the light scattered or reflected from a halftone dot will maximally vary depending upon the halftone dot's azimuth orientation to the light source when that halftone has an anisotropic structure. FIG. 2 provides an example of what is meant by anisotropic structure.

In FIG. 2, a simple line-screen halftone of anisotropic nature is presented in two orientations relative to impinging incident light 200, a parallel orientation 210, and a perpendicular orientation 220. Both halftone dot orientations are selected to be similar in density so that the diffuse light and incident light at orthogonal angles to the paper are equal. In this way, the light which is available to scanner 3 or to the human eye from straight on is the same. However, the specular reflected light 12 is considerably greater for the anisotropic parallel orientation 210. If as printed, a mass of the 210 parallel orientation halftones are butted directly adjacent to a mass of 220 perpendicular orientation halftones, there will be a difference in reflected light between them, which when viewed from an angle will be perceived as a shift in gloss differential or a glossmark. The perceptibility of this gloss differential will be maximized when the halftone anisotropic orientations are 90 degrees apart as shown here in FIG. 2.

Figure 3:
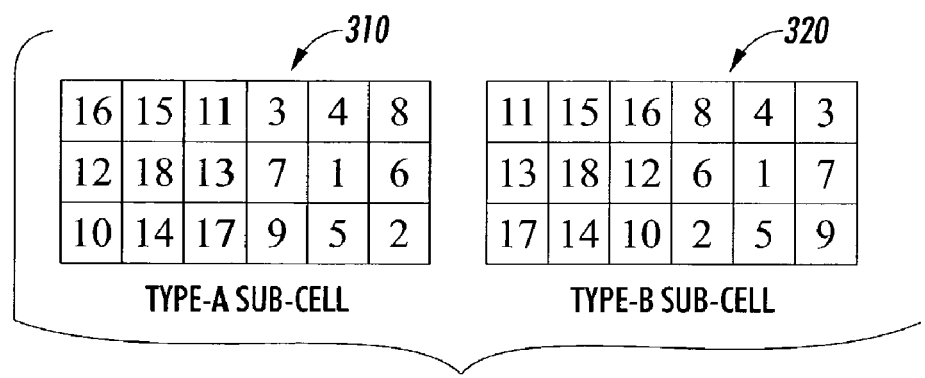
FIG. 3 shows two 3×6 halftone patterns suitable in anisotropic structure to produce discernable gloss differential for practicing the present invention.
Figure 4:
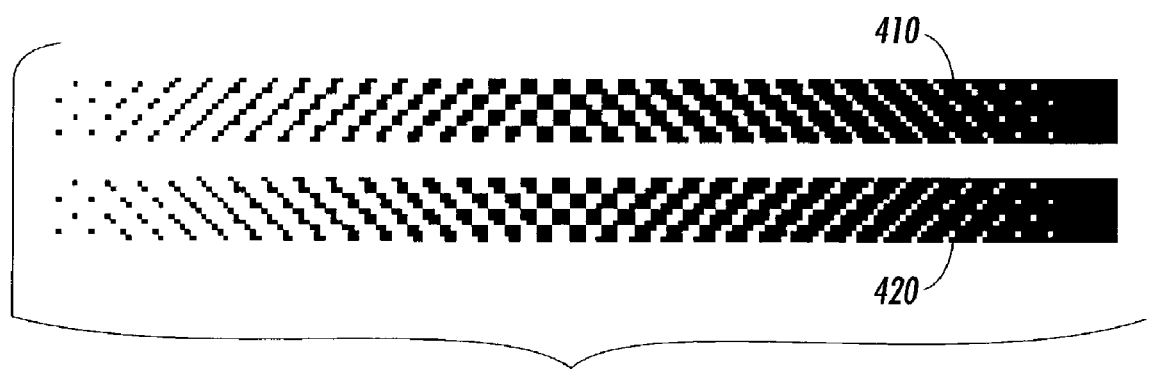
FIG. 4 is a density sweep of the two halftone patterns of FIG. 3.

FIG. 3 shows example halftone cells suitable for a skilled practitioner to employ in an embodiment employing the teachings of the present invention. They are but one useful example as will be evident to those skilled in the art. Each halftone cell is comprised as a three by six pixel array. The turn on/off sequence is numerically indicated. Note the diagonal orientation of the pixel numbering. The type-A sub-cell 310 and type-B sub-cell 320 both have a 45 degree orientation, one to the right and the other to the left. This orientation can be clearly seen in the density sweeps 410 and 420 of FIG. 4. To maximize the perceptibility of the gloss differential, the orientations of sub-cells type-A and type-B are arranged 90 degrees apart one from the other.

Figure 5:
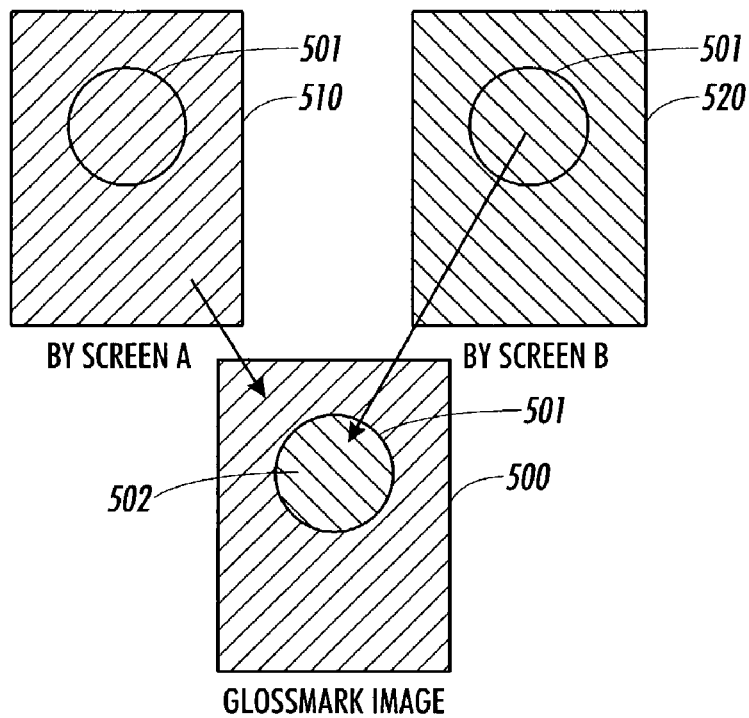
FIG. 5 depicts a patchwork alternating of the two halftone patterns of FIG. 3 so as to achieve a glossmark.

FIG. 5 depicts a glossmark image 500 achievable using halftone cells as described above. Screen-A 510 uses one halftone cell type and screen-B 520 uses the other. The circle 501 is provided as a visual aid across the image screens 500, 510 and 520. The desired glossmark here is for a sphere 502 to be perceived in the midst of image 500. Screen-A 510 provides the field of right diagonal oriented anisotropic halftones and screen 520 provides the spherical area of left diagonal oriented anisotropic halftone cells. In this manner, a selection of the two screen types are patch-worked together to create the glossmark image 500.

Figure 6:
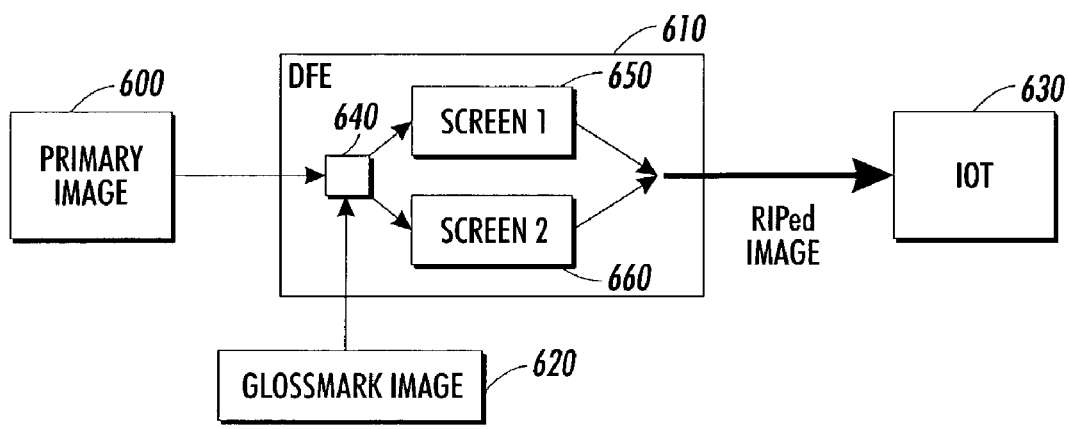
FIG. 6 shows one embodiment for achieving the image directed alternation of the halftone patterns for glossmarks as depicted in FIG. 5, utilizing the halftone patterns of FIG. 3.

An another approach for the assembly of a glossmark image is diagramed in FIG. 6. Here, the primary image 600 is received as input data to the digital front-end (DFE) 610 as is normal. However, a desired glossmark image 620 is also received as input data to the DFE 610 as well. The processed image as sent to the image output terminal (IOT) 630 is a binary image by halftoning the primary image 600 data as is normal. However, the halftone type selection is driven by the intended glossmark image data 620 as input to multiplexer switch 640. The intended glossmark image data 620 will serve to direct a portion of the primary image 600 to use a first anisotropic structured halftone while directing an alternative halftone to be used for the remainder of primary image 600. As will be understood by those skilled in the art, the intended glossmark image data 620 may be flattened into simple zero and one pixel data representations if needed in the DFE 610. This pattern of zero and ones are then used to toggle the multiplexer 640 to one halftone anisotropic structure orientation type or the other. Multiplexer 640 therefore toggles between either screen 1 type halftone 650 or screen 2 halftone type 660, as dictated by the desired glossmark data 620, to produce the composite result of raster input processed (RIP) image data as passed to the IOT 630. In this way, a superimposition of a pattern 620 is imbedded into the primary image 600 which can only be perceived as gloss differential glossmark.

Figure 7:
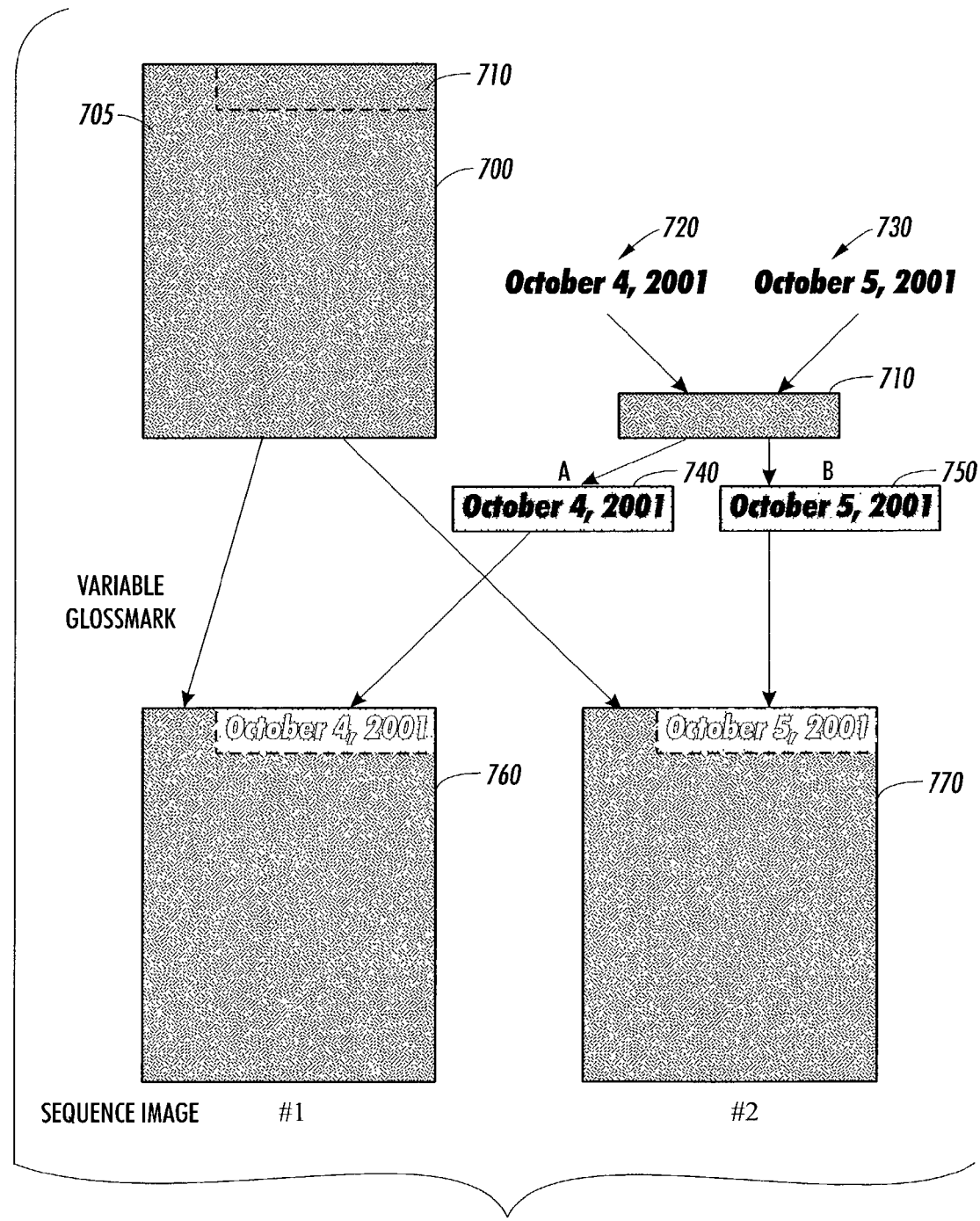
FIG. 7 depicts a visualization for the swapping of a small portion of an image of interest for a suitable variable glossmark image segment.

In FIG. 7, there is depicted the swapping of only a small segment of an image of interest 700 with a variable glossmark image segment 710. If only a small area of a given image of interest 700 is needed to satisfy the desire for glossmarking, the problems of increased processing time and memory storage overhead in the accommodation of glossmarks can be greatly ameliorated. There are many situations where only a small area of an image 700 is targeted for glossmarking. For example, a date/time stamp is a very common and popular image adjunct. Having such information available in a manner which is less visually intrusive while viewing a desired image of interest is preferable and readily achieved by glossmarking the time/date stamp information. Utilization of variable glossmark image segment 710 is of particularly attractive use when the data contained therein is ephemeral in nature or often changing. Other scenarios of such use is in accommodating serial numbers as glossmarks for either tickets or coupons and may include job processing/integrity numbers, bar-codes, company trademarks or logos. Glossmarking applied to such uses discourages falsification or fraud while serial numbers or other changing indicia allows for tracking.

As described in FIG. 7, the image of interest data 700 is segmented into a main area 705 and an image segment area 710. The main area 705 is conventionally halftoned with a first halftone having a first anisotropic structure orientation. However, for the image segment 710 the halftoning is performed as per the description provided above for FIGS. 5 and 6. The variable glossmark image segment 710 utilizes the input data from image 700 corresponding to the segment area. This is utilized as the primary image data 610 to the DFE. The glossmark data, which for example A is "Oct. 4, 2001" 720 is utilized as the input to multiplexer switch 640. In this manner variable glossmark image segment 710 is halftoned with both the first halftone having a first anisotropic structure orientation and a second halftone having a second anisotropic structure orientation. In this example, variable glossmark 740 is the result. In one embodiment, the area of segment 710 which is not to be overlaid by glossmark data, i.e. the background, is halftoned with the first halftone type as used for main image area 700. In an alternative, the background is halftoned with a second halftone having a second anisotropic structure orientation.

In a second example "B", as displayed in FIG. 7, the same image of interest data 700 and image segment 710 are employed. However, the glossmark data 730 is "Oct. 5, 2001". The same methodology, as just described above, is employed again to result in variable glossmark 750 for this example. For both examples "A" & "B", the variable glossmark images 740 and 750 are each independently merged with the halftoned main image of interest data 705 to create the respective sequence images 760 and 770. While FIG. 7 depicts only two glossmark date stamps by example, it will be apparent to those skilled in the art the technique may be applied for as many variable glossmark segments as there is desire and storage available to accommodate.

In closing, by applying the glossmark methodology to only a small segment of an image of interest, the processing overhead and storage requirements are significantly reduced in an exemplary manner. This methodology is exemplary when the accommodation of variable data is desirable as when for example time/date stamps, serial numbers, trademarks, indicia of monetary value or any other indicia are applied as glossmarks upon an image of interest.

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention. All such variants are intended to be encompassed by the following claims:

The invention claimed is:

1. A method for variable glossmark control comprising:
    segmenting an image of interest into a main area and a segment area
    selecting a first halftone having a first anisotropic structure orientation;
    selecting a second halftone having a second anisotropic structure orientation different from that of the first halftone;
    applying the first halftone to the main area and at least some portion of the segment area; and
    applying the second halftone to the remaining portion of the segment area to produce a variable glossmark.

2. The method of claim 1 wherein the first anisotropic structure orientation and the second anisotropic structure orientation are 90 degrees apart.

3. The method of claim 2 wherein the first anisotropic structure has a horizontal orientation and the second anisotropic structure has vertical orientation.

4. The method of claim 3 wherein the first and second halftones are line type halftones.

5. The method of claim 3 wherein the first and second halftones are dot type halftones.

6. The method of claim 2 wherein the first anisotropic structure has a 45 degree orientation to the right and the second anisotropic structure has a 45 degree orientation to the left.

7. The method of claim 1 wherein the first anisotropic structure orientation and the second anisotropic structure orientation are less than 90 degrees apart.

8. The method of claim 1 wherein the variable glossmark is intended for an ink jet printer.

9. The method of claim 1 wherein the variable glossmark is intended for an electrostaticgraphic printer.

10. The method of claim 1 wherein the variable glossmark is intended for printing upon paper.

11. The method of claim 1 wherein the variable glossmark is intended for printing upon a transparency.

12. The method of claim 1 wherein the variable glossmark indicates time information.

13. The method of claim 1 wherein the variable glossmark indicates date information.

14. The method of claim 1 wherein the variable glossmark indicates identification information.

15. The method of claim 14 wherein the variable glossmark indicates serial number information.

16. The method of claim 1 wherein the variable glossmark indicates monetary value information.

17. The method of claim 1 wherein the variable glossmark indicates job processing information.

18. The method of claim 1 wherein the variable glossmark indicates a bar-code.

19. The method of claim 1 wherein the variable glossmark indicates a logo.

20. A method for variable glossmark control comprising:
    segmenting an image of interest into a main area and a segment area;
    selecting a first halftone having a first anisotropic structure orientation;
    selecting a second halftone having a second anisotropic structure orientation different from that of the first halftone;
    selecting a third halftone different from the first halftone and the second halftone;
    applying the first halftone to at least some portion of the segment area;
    applying the second halftone to the remaining portion of the segment area to produce a variable glossmark; and
    applying the third halftone to the main area.

21. The method of claim 20 wherein the third halftone is a stochastic type.

22. The method of claim 20 wherein the third halftone is a cluster dot type.

23. The method of claim 20 wherein the variable glossmark is intended for an ink jet printer.

24. The method of claim 20 wherein the variable glossmark is intended for an electrostaticgraphic printer.

25. The method of claim 20 wherein the first anisotropic structure orientation and the second anisotropic structure orientation are 90 degrees apart.

26. The method of claim 20 wherein the first anisotropic structure orientation and the second anisotropic structure orientation are less than 90 degrees apart.

27. The method of claim 20 wherein the third halftone has an anisotropic structure orientation different from both the first halftone and the second halftone.

28. The method of claim 25 wherein the first anisotropic structure has a 45 degree orientation to the right and the second anisotropic structure has a 45 degree orientation to the left.

29. The method of claim 20 wherein the variable glossmark indicates time information.

30. The method of claim 20 wherein the variable glossmark indicates date information.

31. The method of claim 20 wherein the variable glossmark indicates identification information.

32. The method of claim 20 wherein the variable glossmark indicates serial number information.

33. The method of claim 20 wherein the variable glossmark indicates monetary value information.

34. The method of claim 20 wherein the variable glossmark indicates job processing information.

35. The method of claim 20 wherein the variable glossmark indicates a bar-code.

36. The method of claim 20 wherein the variable glossmark indicates a logo.

* * * * *